(12) United States Patent
Flamen

(10) Patent No.: US 10,918,895 B1
(45) Date of Patent: Feb. 16, 2021

(54) MOUTHPIECE INSERT FOR PERSONAL PROTECTIVE EQUIPMENT

(71) Applicant: Michael Flamen, Garden City, NY (US)

(72) Inventor: Michael Flamen, Garden City, NY (US)

( * ) Notice: Subject to any disclaimer, the term of this patent is extended or adjusted under 35 U.S.C. 154(b) by 0 days.

(21) Appl. No.: 17/024,445

(22) Filed: Sep. 17, 2020

(51) Int. Cl.
*A62B 23/02* (2006.01)
*B01D 46/00* (2006.01)
*B01D 39/16* (2006.01)
*A41D 13/11* (2006.01)

(52) U.S. Cl.
CPC .......... *A62B 23/02* (2013.01); *B01D 39/1623* (2013.01); *B01D 46/002* (2013.01); *B01D 46/0032* (2013.01); *A41D 13/11* (2013.01); *B01D 2239/0435* (2013.01); *B01D 2239/0618* (2013.01); *B01D 2279/40* (2013.01)

(58) Field of Classification Search
CPC ......... A41D 13/11; A62B 23/02; A62B 18/08; A62B 9/06; B01D 39/1623; B01D 46/002; B01D 2239/0435; B01D 2239/0618; B01D 2279/40
See application file for complete search history.

(56) References Cited

U.S. PATENT DOCUMENTS

| | | | | |
|---|---|---|---|---|
| 4,601,287 A | * | 7/1986 | Royce, Jr. | A62B 23/02 128/204.17 |
| 5,186,165 A | * | 2/1993 | Swann | A62B 17/04 128/201.25 |
| 5,871,011 A | * | 2/1999 | Howell | A61M 16/009 128/206.22 |
| 10,617,896 B1 | * | 4/2020 | West | A62B 9/003 |
| 2017/0050058 A1 | * | 2/2017 | Konrad | A62B 23/02 |
| 2017/0252588 A1 | * | 9/2017 | Key | B01D 46/0089 |
| 2018/0008847 A1 | * | 1/2018 | Key | A63B 71/10 |
| 2018/0207454 A1 | * | 7/2018 | Eilermann | A41D 13/11 |
| 2019/0247682 A1 | * | 8/2019 | Sutherland | A41D 13/1107 |

* cited by examiner

*Primary Examiner* — Robert Clemente
(74) *Attorney, Agent, or Firm* — Sean R. Wilsusen, Esq.; Carter, DeLuca & Farrell LLP

(57) ABSTRACT

A mouthpiece insert for personal protective equipment (PPE) includes a body defining an air passage. The air passage includes a first extending portion and a second extending portion in fluid communication with the first extending portion. A first orifice is formed in the first extending portion. The first orifice is configured to face a user's nose. A second orifice is formed in the first extending portion. The second orifice is configured to face the user's mouth. A third orifice is formed in the second extending portion. The third orifice is configured to be positioned below the user's chin. The air passage provides airflow from outside a PPE mask to the user's nose and mouth.

17 Claims, 6 Drawing Sheets

MOUTHPIECE INSERT FOR PERSONAL PROTECTIVE EQUIPMENT

FIELD

The present disclosure relates to a mouthpiece insert and, more specifically, to a mouthpiece insert for Personal Protective Equipment (PPE) masks.

BACKGROUND

PPE imposes a physical barrier between a user and the outside environment. A mask is one form of PPE that is commonly used to reduce or prevent the transmission of viruses, such as SARS-CoV-2. PPE masks create a physical barrier between the user and the exterior environment. Some PPE masks employ a respirator, while some do not. PPE masks are at least somewhat breathable; however, user's often find PPE masks at least partially uncomfortable due to decreased airflow compared with unobstructed breathing in which a PPE mask is not being used.

SUMMARY

Provided in accordance with aspects of the present disclosure is a mouthpiece insert for personal protective equipment (PPE) including a body defining an air passage therein. The air passage defines a first extending portion and a second extending portion in fluid communication with the first extending portion. A first orifice is formed in the first extending portion. The first orifice is configured to face a user's nose. A second orifice is formed in the first extending portion. The second orifice is configured to face the user's mouth. A third orifice is formed in the second extending portion. The third orifice is configured to be positioned below the user's chin. The air passage provides airflow from outside a PPE mask to the user's nose and mouth.

In an aspect of the present disclosure, a filter is disposed in the third orifice. The filter is configured to filter at least 95% of airborne particles having a size of at least 0.3 microns. The filter includes an electrostatic non-woven polypropylene fiber.

In an aspect of the present disclosure, the first extending portion or the second extending portion defines a curved profile.

In an aspect of the present disclosure, the second extending portion extends in a substantially perpendicular direction with respect to the first extending portion.

In an aspect of the present disclosure, the third orifice faces in a substantially perpendicular direction with respect to the first orifice.

In an aspect of the present disclosure, the second extending portion extends in substantially a same direction as the first extending portion. The first orifice faces in a direction opposite from a direction in which the third orifice faces.

In an aspect of the present disclosure, the second extending portion has a narrower diameter than a diameter of the first extending portion.

In an aspect of the present disclosure, the second extending portion has a wider width than a width of the first extending portion.

In an aspect of the present disclosure, the second extending portion has a narrower width than a width of the first extending portion.

In an aspect of the present disclosure, a second filter is disposed in the second orifice. The second filter is configured to filter at least 95% of airborne particles having a size of at least 0.3 microns. The second filter includes an electrostatic non-woven polypropylene fiber.

In an aspect of the present disclosure, a third filter is disposed in the third orifice. The third filter is configured to filter at least 95% of airborne particles having a size of at least 0.3 microns. The third filter includes an electrostatic non-woven polypropylene fiber.

BRIEF DESCRIPTION OF THE DRAWINGS

Various aspects and features of the present disclosure are described hereinbelow with reference to the drawings wherein.

DETAILED DESCRIPTION

Figure 1:
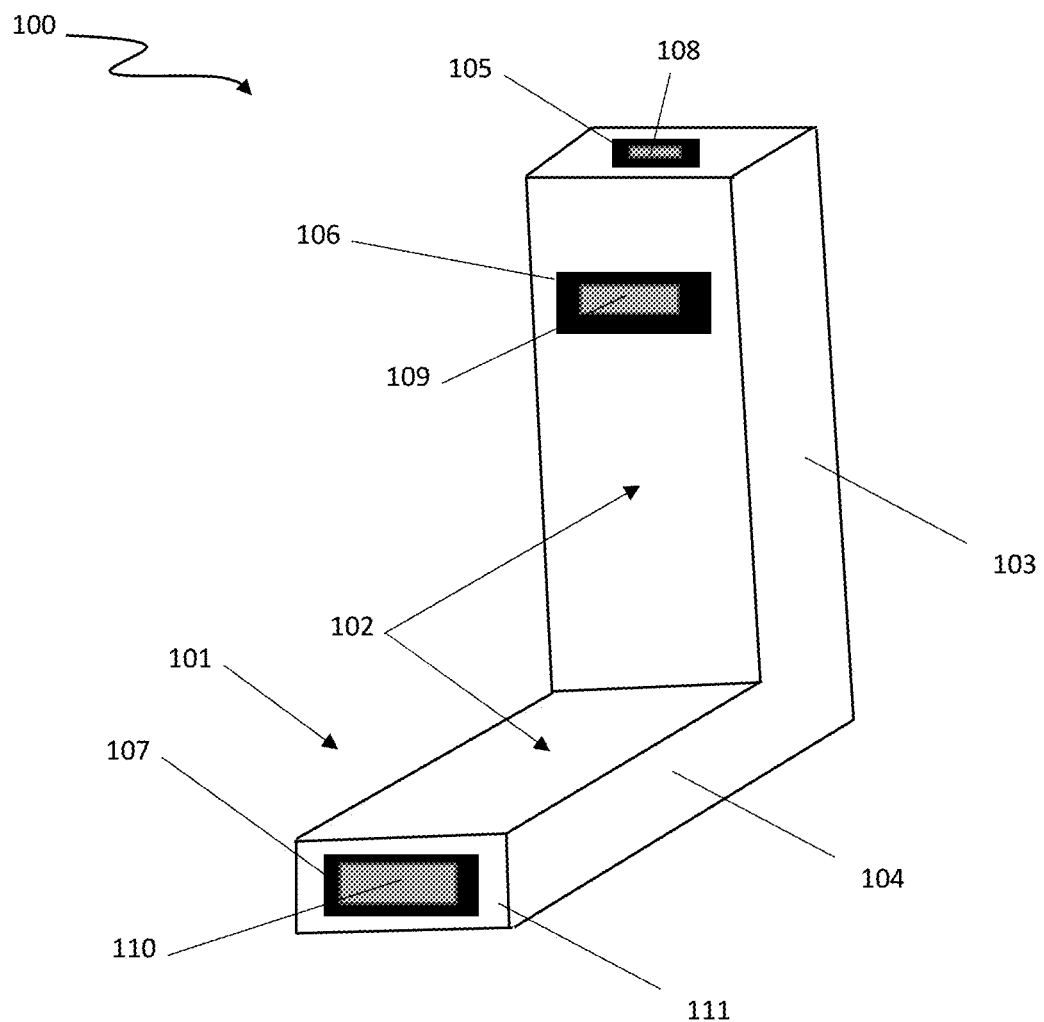
FIG. 1 is a front perspective view of a mouthpiece insert for personal protective equipment (PPE) according to aspects of the present disclosure.

The terms "about," substantially," and the like, as utilized herein, are meant to account for manufacturing, material, environmental, use, and/or measurement tolerances and variations, and in any event may encompass differences of up to 10%. Further, to the extent consistent, any of the aspects described herein may be used in conjunction with any or all of the other aspects described herein.

Descriptions of technical features or aspects of an exemplary configuration of the disclosure should typically be considered as available and applicable to other similar features or aspects in another exemplary configuration of the disclosure. Accordingly, technical features described herein according to one exemplary configuration of the disclosure may be applicable to other exemplary configurations of the disclosure, and thus duplicative descriptions may be omitted herein.

Exemplary configurations of the disclosure will be described more fully below (e.g., with reference to the accompanying drawings). Like reference numerals may refer to like elements throughout the specification and drawings.

Unless otherwise indicated herein, mouthpiece inserts 300-600 may each include the same features as mouthpiece insert 100.

Figure 2:
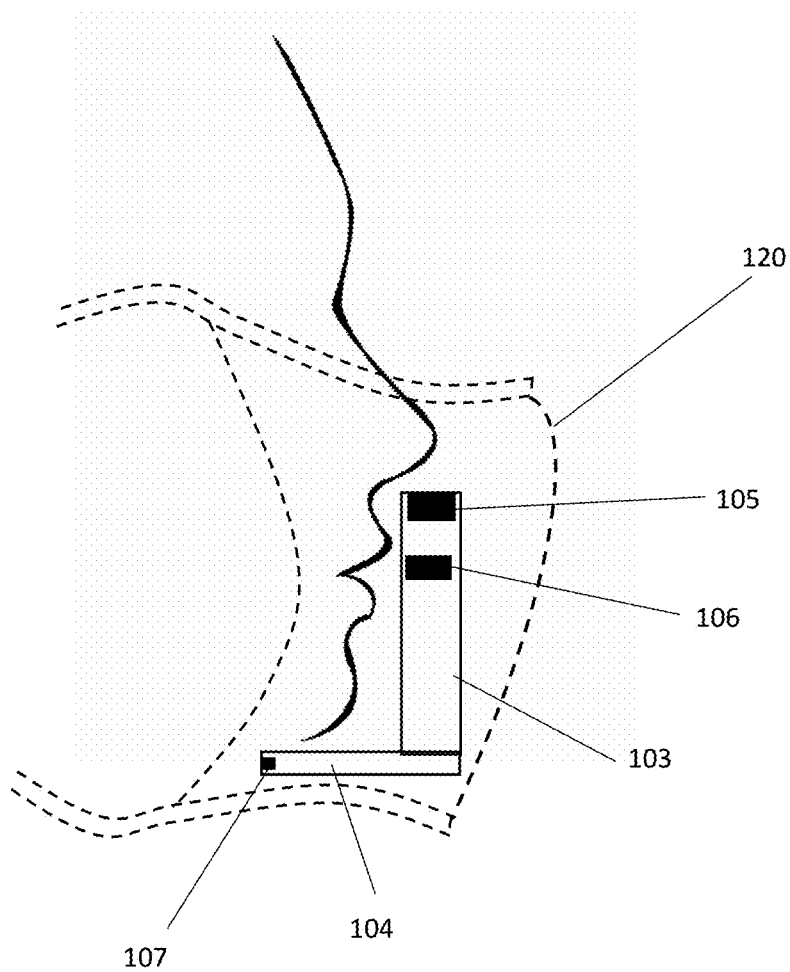
FIG. 2 is a profile view of the mouthpiece insert for PPE of FIG. 1 inside a PPE mask according to aspects of the present disclosure.

FIG. 1 is a front perspective view of a mouthpiece insert 100 for personal protective equipment (PPE) according to aspects of the present disclosure. FIG. 2 is a profile view the mouthpiece insert 100 for PPE of FIG. 1 inside a PPE mask 120 according to aspects of the present disclosure.

Referring particularly to FIGS. 1 and 2, mouthpiece insert 100 includes a body 101 defining an air passage therein 102. The air passage 102 defines a first extending portion 103 and a second extending portion 104 in fluid communication with the first extending portion 103. A first orifice 105 is formed in the first extending portion 103. The first orifice 105 is configured to face a user's nose and to provide airflow to the user's nose. A second orifice 106 is formed in the first extending portion 103. The second orifice 103 is configured to face the user's mouth and to provide airflow to the user's mouth. A third orifice 107 is formed in the second extending portion 104. The third orifice 107 is configured to be positioned below the user's chin. The air passage provides airflow from outside a PPE mask to the user's nose and mouth. That is, the air passage 102 provides a continuous passage for air to flow from outside the PPE mask 120 to a user's nose and mouth to increase airflow to a user, while also minimizing contact between the PPE mask 120 and the user's face.

In use, the mouthpiece insert 100 is positioned inside the PPE mask 120, such as a surgical mask, a cloth mask, a respirator mask. The mouthpiece insert 100 creates physical spacing between an inside of the PPE mask 120 and the user's face, thus increasing a comfort level of the user. The third orifice 107 provides airflow access into and out of air passage 102 to provide airflow to and from a user's nose and mouth. An end 111 of the second extending portion 104 may be positioned and dimensioned to be within the PPE mask 110 but immediately adjacent to an outer boundary of the PPE mask 120, or may be positioned to protrude slightly from the PPE mask 120. For example, the third orifice 107 may be positioned below a user's chin and exposed to the air outside the PPE mask 120 (i.e., may protrude slightly from the PPE mask 120). This allows for increased airflow to a user's nose and mouth, while still preventing viral particles from being passed into or out of the area immediately adjacent a user's face that is covered by the PPE mask 120.

As an example, the body 101 may be formed of or may include plastic. The body 101 may be configured to be sterilized, while each of the filters 108, 109, 110 described herein may be replaceable. Thus, the mouthpiece insert 100 may be configured for repeated use.

The orifices 105, 106, 107 may each be substantially rectangular, substantially oval, or substantially circular; however, other shapes may also be employed. For example, the shapes of orifices 105, 106 may correspond with shapes of a user's nose or mouth, respectively.

In an aspect of the present disclosure, a filter 110 is disposed in the third orifice 107. The filter 110 is configured to filter at least 95% of airborne particles (e.g., SARS-CoV-2 viral particles) having a size of at least 0.3 microns. The filter 110 may include an electrostatic non-woven polypropylene fiber. The filter 110 is configured to filter airborne particles in both in-flow and out-flow directions.

In an aspect of the present disclosure, second filter 109 is disposed in the second orifice 106, and a third filter 108 is disposed in the first orifice 105. The second filter 109 and the third filter 108 have substantially the same configuration as filter 110. Each filter 108, 109, 110 has a shape corresponding with a shape of its corresponding orifice.

Figure 3:
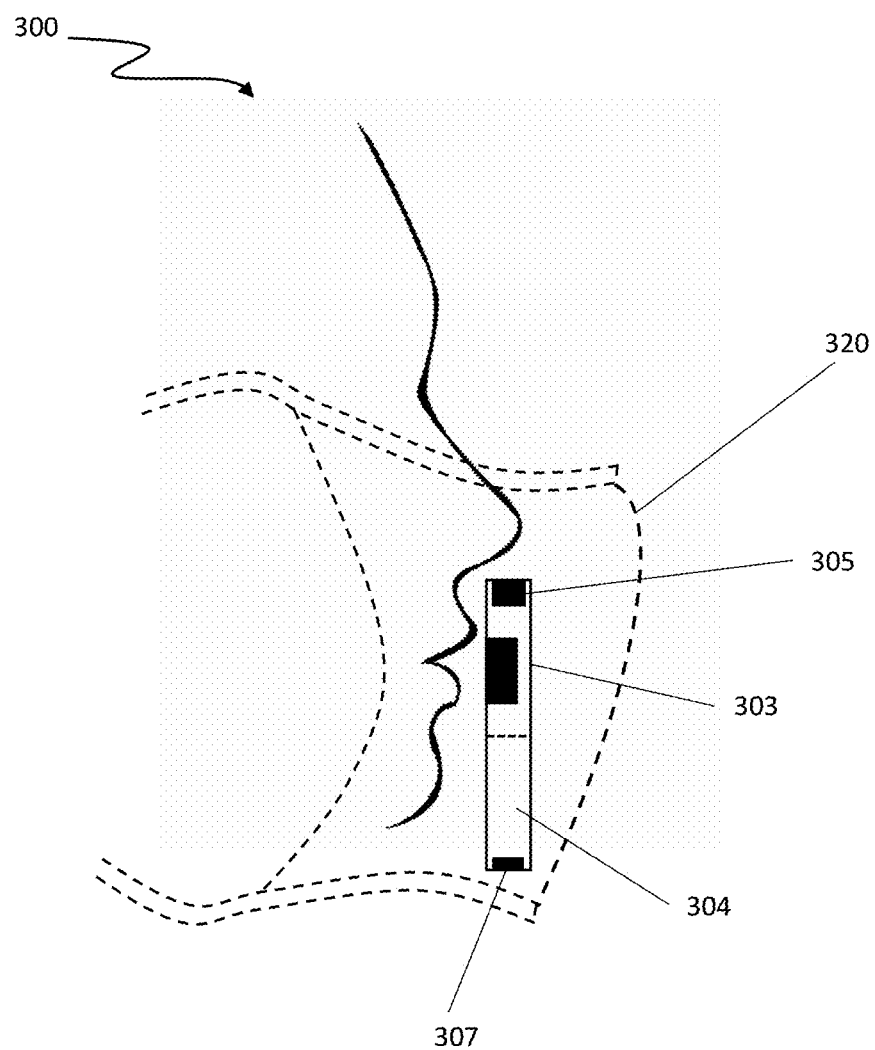
FIG. 3 is a profile view of a mouthpiece insert for PPE inside a PPE mask according to aspects of the present disclosure.

FIG. 3 is a profile view of a mouthpiece insert 300 for PPE inside a PPE mask 320 according to aspects of the present disclosure. Referring particularly to FIG. 3, the second extending portion 304 extends in substantially a same direction as the first extending portion 303. The first orifice 305 faces in a direction opposite from a direction in which the third orifice 307 faces. Thus, the mouthpiece insert 300 defines a substantially linear configuration in which the third orifice 307 faces in a downward direction away from the user's nose.

Figure 4:
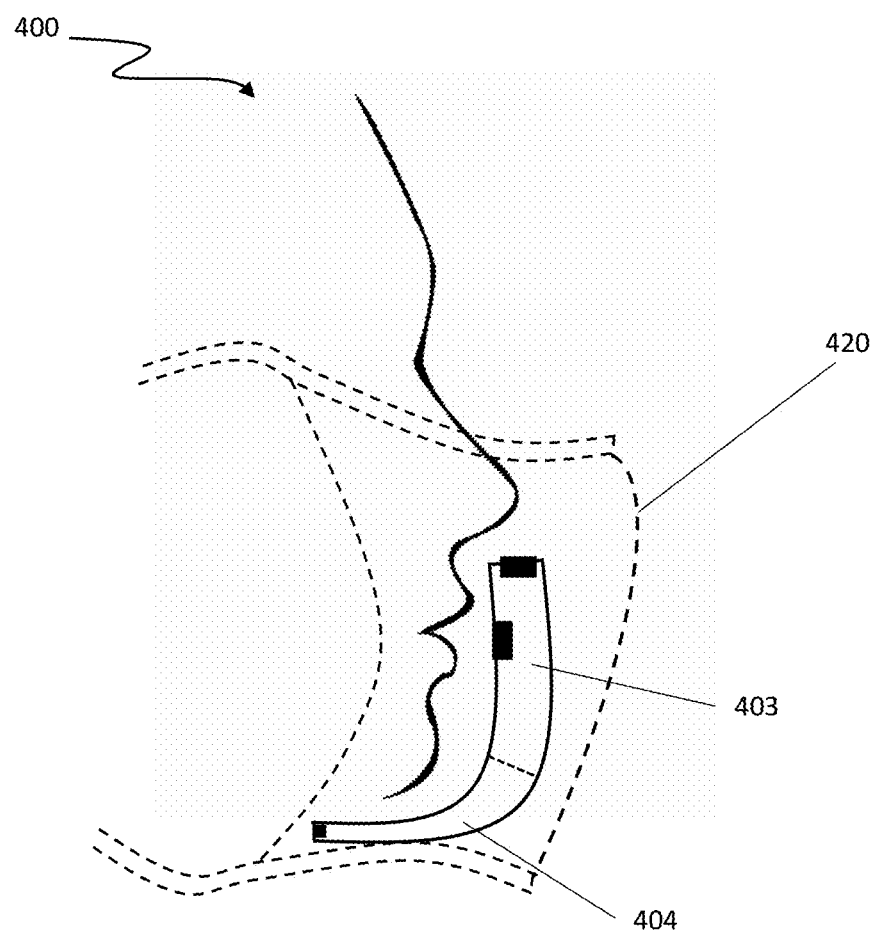
FIG. 4 is a profile view of a mouthpiece insert for PPE inside a PPE mask according to aspects of the present disclosure.

FIG. 4 is a profile view of a mouthpiece insert 400 for PPE inside a PPE mask 420 according to aspects of the present disclosure. Referring particularly to FIG. 4, the first extending portion 403 and/or the second extending portion 404 defines a curved profile. The curved profile allows the second extending portion 404 to curve underneath a user's chin.

Figure 5:
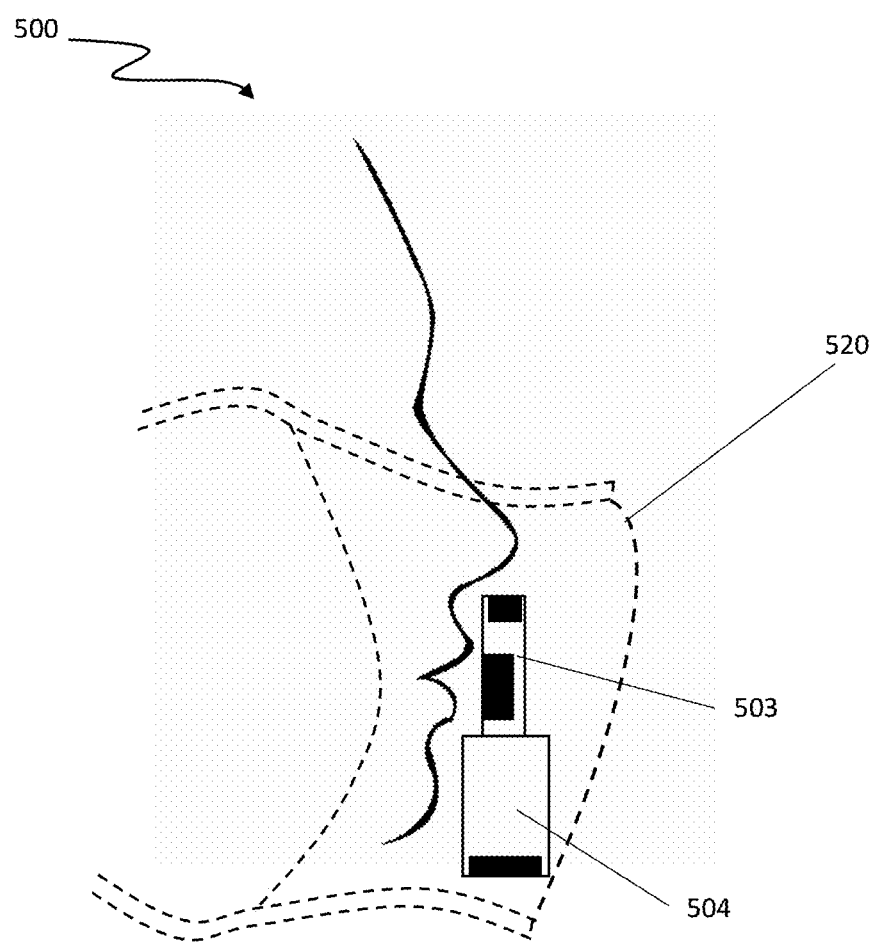
FIG. 5 is a profile view of a mouthpiece insert for PPE inside a PPE mask according to aspects of the present disclosure.

FIG. 5 is a profile view of a mouthpiece insert 500 for PPE inside a PPE mask 520 according to aspects of the present disclosure. Referring particularly to FIG. 5, the second extending portion 504 has a wider width, or a wider diameter, than the first extending portion 503.

Figure 6:
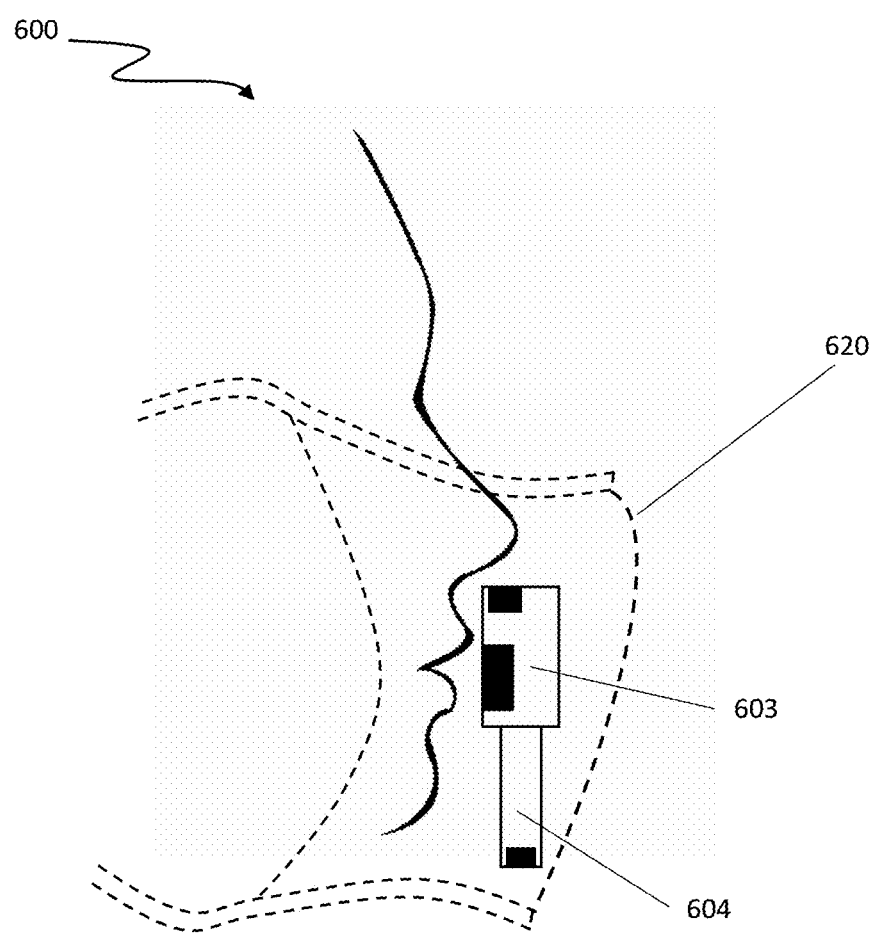
FIG. 6 is a profile view of a mouthpiece insert for PPE inside a PPE mask according to aspects of the present disclosure.

FIG. 6 is a profile view of a mouthpiece insert 600 for PPE inside a PPE mask 620 according to aspects of the present disclosure. Referring particularly to FIG. 6, the second extending portion 604 has a narrower width, or a narrower diameter, than the first extending portion 603.

With reference to FIGS. 1 to 6 herein, a size of the air passage (e.g., air passage 102) corresponds with a width or a diameter of the extending portions (e.g., extending portions 103, 104) through which the air passage is defined. Thus, a narrower extending portion would have a narrower air passage therein.

It will be understood that various modifications may be made to the aspects and features disclosed herein. Therefore, the above description should not be construed as limiting, but merely as exemplifications of various aspects and features. Those skilled in the art will envision other modifications within the scope and spirit of the claims appended thereto.

What is claimed is:

1. A mouthpiece insert for personal protective equipment (PPE), comprising:
    a body defining an air passage therein, the air passage including a first extending portion and a second extending portion in fluid communication with the first extending portion;
    a first orifice formed in the first extending portion, the first orifice configured to face a user's nose;
    a second orifice formed in the first extending portion, the second orifice configured to face the user's mouth;
    a third orifice formed in the second extending portion, the third orifice configured to be positioned below the user's chin,
    wherein the air passage provides airflow from outside a PPE mask to the user's nose and mouth; and
    a filter disposed in the third orifice.

2. The mouthpiece insert for personal protective equipment of claim 1, wherein the filter is configured to filter at least 95% of airborne particles having a size of at least 0.3 microns.

3. The mouthpiece insert for personal protective equipment of claim 2, wherein the filter includes an electrostatic non-woven polypropylene fiber.

4. The mouthpiece insert for personal protective equipment of claim 1, wherein the second extending portion extends in a substantially perpendicular direction with respect to the first extending portion.

5. The mouthpiece insert for personal protective equipment of claim 4, wherein the third orifice faces in a substantially perpendicular direction with respect to the first orifice.

6. The mouthpiece insert for personal protective equipment of claim 1, wherein the second extending portion extends in substantially a same direction as the first extending portion.

7. The mouthpiece insert for personal protective equipment of claim 6, wherein the first orifice faces in a direction opposite from a direction in which the third orifice faces.

8. The mouthpiece insert for personal protective equipment of claim 1, wherein the second extending portion has a narrower diameter than a diameter of the first extending portion.

9. The mouthpiece insert for personal protective equipment of claim 1, wherein the second extending portion has a wider width than a width of the first extending portion.

10. The mouthpiece insert for personal protective equipment of claim 1, wherein the second extending portion has a narrower width than a width of the first extending portion.

11. The mouthpiece insert for personal protective equipment of claim 1, further including a second filter disposed in the second orifice.

12. The mouthpiece insert for personal protective equipment of claim 11, wherein the second filter is configured to filter at least 95% of airborne particles having a size of at least 0.3 microns.

13. The mouthpiece insert for personal protective equipment of claim 12, wherein the second filter includes an electrostatic non-woven polypropylene fiber.

14. The mouthpiece insert for personal protective equipment of claim 1, further including a third filter disposed in the second orifice.

15. The mouthpiece insert for personal protective equipment of claim 14, wherein the third filter is configured to filter at least 95% of airborne particles having a size of at least 0.3 microns.

16. The mouthpiece insert for personal protective equipment of claim 15, wherein the third filter includes an electrostatic non-woven polypropylene fiber.

17. A mouthpiece insert for personal protective equipment (PPE), comprising:
 a body defining an air passage therein, the air passage including a first extending portion and a second extending portion in fluid communication with the first extending portion;
 a first orifice formed in the first extending portion, the first orifice configured to face a user's nose;
 a second orifice formed in the first extending portion, the second orifice configured to face the user's mouth; and
 a third orifice formed in the second extending portion, the third orifice configured to be positioned below the user's chin,
 wherein the air passage provides airflow from outside a PPE mask to the user's nose and mouth,
 and wherein the first extending portion or the second extending portion defines a curved profile.

* * * * *